Oct. 27, 1936.  J. MIHALYI  2,058,483
DIAPHRAGM CONTROL FOR PHOTOGRAPHIC APPARATUS
Filed March 13, 1934  2 Sheets-Sheet 2
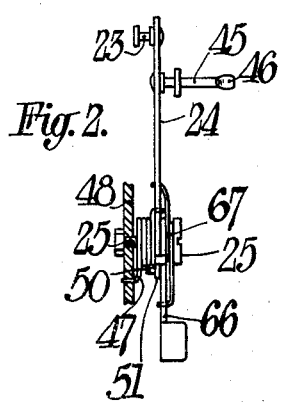
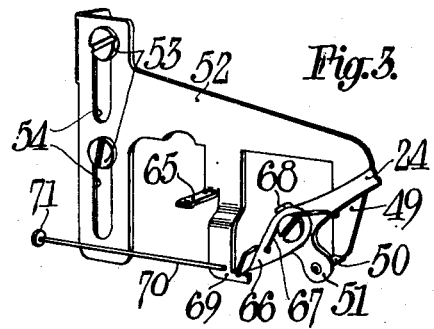
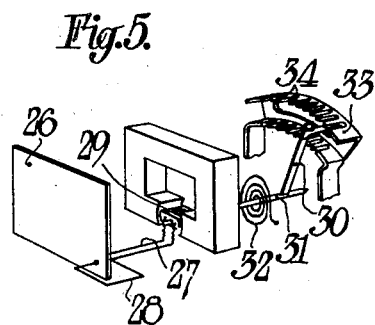
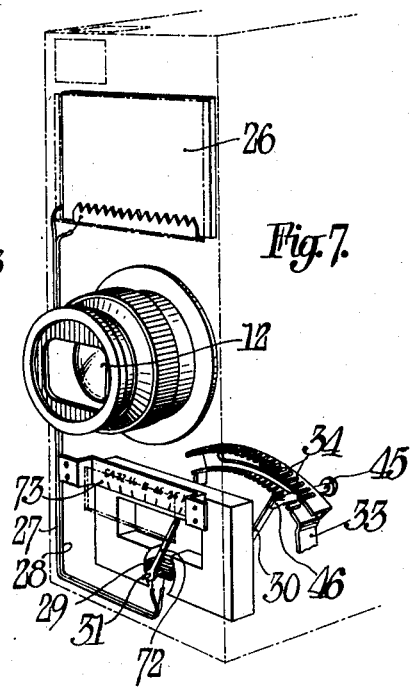
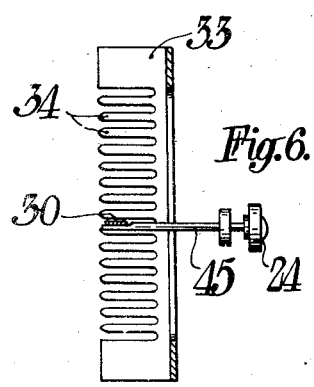
Inventor:
Joseph Mihalyi,
By Newton M. ...
Holla H. Carter
Attorneys Patented Oct. 27, 1936

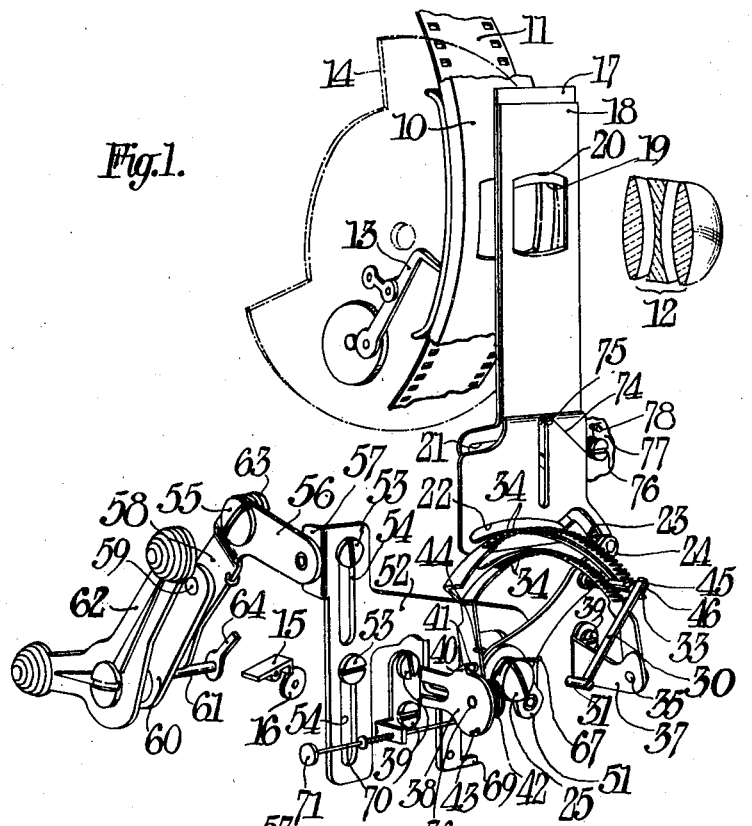

2,058,483

UNITED STATES PATENT OFFICE 2,058,483

DIAPHRAGM CONTROL FOR PHOTOGRAPHIC APPARATUS

Joseph Mihalyi, Rochester, N. Y., assignor, by mesne assignments, to Eastman Kodak Company, Jersey City, N. J., a corporation of New Jersey Application March 13, 1934, Serial No. 715,284

7 Claims. (Cl. 88—16)

My invention relates to photographic apparatus and particularly to photographic cameras in which a diaphragm is adjusted to regulate the intensity of the light transmitted by the camera objective to the sensitive film positioned in the focal plane of the objective.

In photographing scenes under constantly changing lighting conditions it is very difficult for even a skilled operator to judge correctly the exposure which is proper for the existing conditions and although the range of present day films is so great that most amateurs can judge exposures with sufficient accuracy to obtain acceptable results, it is highly desirable to provide them with apparatus with which the best result possible under any given condition may be secured without requiring a substantial time interval for making measurements and calculating camera settings.

It is, accordingly, an object of my invention to provide, for photographic cameras, a device which automatically takes cognizance of the existing lighting condition and translates it into a setting of the exposing mechanism of the camera whenever the operating lever of the camera is actuated to make an exposure.

In accordance with my invention I bias the movable element of a light limiting device to one extreme position and resiliently attach it to the exposure operating lever of the camera so that initial movement of this lever will move the element to its other extreme position after which further movement of the lever actuates the camera exposure mechanism. By inserting an obstacle at some point in the path of the movable element of the light limiting device, which will hereinafter be referred to as a diaphragm, its movement will be arrested without arresting the movement of the operating lever due to the resilient connection between them. Obviously if the position of this obstacle relatively to the movable element can be adjusted in strict accordance with the prevailing light conditions then the light transmission or opening of the diaphragm at the time its movable element is arrested will be such that an exposure made at this opening will be the correct one, provided other fixed factors such as shutter speed, speed of the film, etc., have been included in setting up the constants of the device. To regulate the positioning of this obstacle, I provide a light-sensitive element connected to a suitable meter element and utilize the meter pointer as the obstacle. With this arrangement the pointer of a meter actuated by a light-sensitive cell mechanically limits the diaphragm opening to a value which is a function of the intensity of the light received by the cell.

Other features and advantages of my invention will appear from the following description taken in connection with the accompanying drawings, and its scope will be pointed out in the appended claims.

Fig. 1 is a view in perspective showing the mechanism of the invention interconnecting the main operating lever and the diaphragm of a motion picture camera;

Fig. 2 is a side elevation showing the mount for the diaphragm adjusting lever;

Fig. 3 is a view in perspective showing operating means for the diaphragm adjusting lever;

Fig. 4 is a view in perspective of a part of the apparatus shown in Fig. 1 showing the position of the parts during operation of the camera;

Fig. 5 is a perspective view showing diagrammatically the arrangement for actuating the pointer shown in Figs. 1, 4, and 6;

Fig. 6 is a sectional detail of the pointer trapping means; and

Fig. 7 is a perspective view, partly in outline, showing one form of the invention applied to a camera.

In the interest of clarity, I have shown in the drawings only those parts of a camera apparatus necessary to illustrate the manner in which my invention may be applied thereto.

In Fig. 1 the parts shown of an ordinary motion picture camera include a gate 10 for supporting a film 11 in the focal plane of an objective 12. A pulldown mechanism 13 for advancing the film 11 through the gate 10 is actuated in timed relation with a shutter 14, shown in outline, in any well-known manner upon the actuation of the usual camera release lever 15 to remove it from the path of a notched cam 16 provided in the camera drive mechanism (not shown). For regulating the transmission of light from the objective 12 to the film 11 a suitable diaphragming means is provided and is here shown as comprising two plates 17 and 18 of thin sheet metal properly blackened and provided with substantially rectangular openings 19 and 20, respectively, the overlap of which varies to alter the light opening upon relative vertical movement between the two plates 17 and 18.

For varying the overlap of the two openings 19 and 20 to adjust the diaphragm opening, the two plates 17 and 18 are provided with specially shaped cam slots 21 and 22, respectively. A diaphragm blade stud 23 extending through both of the slots 21 and 22 is mounted on a diaphragm adjusting lever 24 which is pivoted on a bolt 25. Rotation of the lever 24 in a counterclockwise direction, as viewed in Fig. 1, moves the stud 23 in the cam slots 21 and 22 to adjust the diaphragm opening as determined by the overlap of the rectangular openings 19 and 20. The extent to which the diaphragm opening is adjusted is a function of the angle through which the diaphragm adjusting lever 24 is rotated.

From this it is obvious that if the angle through which the lever 24 is rotated is controlled in accordance with the existing light conditions then, other constants of the system being right, the diaphragm opening will be set properly for the existing light and the film will be properly exposed. I accomplish this by positioning a light-sensitive cell 26, as shown in Figs. 5 and 7, which preferably is of the photovoltaic type, to be influenced by light reflected from the subject to be photographed. This cell is connected through leads 27 and 28 to a meter coil 29 which is adapted to variably displace a needle pointer 30 in accordance with the intensity of the light falling on the cell 26. The meter coil 29 is mounted on a shaft 31 which carries the pointer 30 and is provided with the usual balancing spring 32.

A pointer entrapping member 33 comprising two concentric arcuate sets of comb teeth 34 is pivotally mounted at 35 and 36 upon two projecting supports 37 and 38, respectively, which are secured to the camera frame in any suitable manner as by screws 39. The projecting support 38 is provided with an abutment 40 to form a bearing surface for a pin 41 carried by the member 33. The pivot 36 carries a coiled spring 42 having one end 43 secured to the support 38 and its other end 44 bearing against an arm of the member 33 to bias it in a direction such that the pin 41 is held against the abutment 40 as shown in Fig. 1.

When the entrapping member 33 is in the position shown in Fig. 1, its comb teeth 34 are out of the path of the pointer 30 which is therefore free to be deflected in accordance with the activation of the light-sensitive cell 26. The diaphragm adjusting lever 24 is provided with a stop stud 45 having a flattened end portion 46 which coincides with and is movable along the path of the pointer 30 when the lever 24 is rotated to adjust the diaphragm opening as above described. When the needle pointer 30 is in a deflected position, the entrapping member 33 is rotated a slight angle upon its pivots and against the torsion of the spring 42 to entrap the pointer 30 between the comb teeth 34. The diaphragm adjusting lever 24 may now be moved only through the angle determined by the position of the pointer 30, that is, until the flattened portion 46 of the stop stud 45 engages the pointer 30 at which time, due to the shapes of the cam slots 21 and 22, the diaphragm opening will have been adjusted to a value corresponding to the position of the pointer 30. It is, of course, possible that this adjustment could be done manually in a separate operation, but I prefer to perform it automatically and one suitable mechanism for accomplishing this adjustment will now be described.

The diaphragm adjusting lever 24 is biased to hold the diaphragm at its smallest opening by a spring 47 which is, as best shown in Fig. 2, secured at one of its ends in a portion of the camera frame indicated at 48 and has its other end extending through the lever 24. The diaphragm is normally held at its greatest opening against the bias of the spring 47 by a leg 49 bearing down upon a pin 50 carried by an arm 51 formed integrally with the diaphragm adjusting lever 24.

The downwardly projecting leg 49 is formed integrally with a member 52 out of a single piece of sheet metal. This member 52 is suitably mounted on the camera frame by means of headed pins 53 extending through vertical slots 54 which permit the member 52 a limited amount of vertical movement. The mechanism for imparting such vertical movement to the member 52 comprises a bell crank member pivoted at 55 and having an arm 56 secured to an ear 57 formed by bending over a portion of the member 52, and a slotted arm 58 which is slidably connected by means of a pin 59 to an arm 60 rigidly secured to a shaft 61 carrying the main operating lever 62. The bell crank comprised of the arms 56 and 58 is biased to the position shown in Fig. 1 by a spring 63 which is stronger than the spring 47 and therefore is effective to hold the diaphragm adjusting lever 24 in the position shown in Fig. 1.

The main operating lever 62 is adapted to be moved to rotate the shaft 61 through an angle sufficient for an arm 64 carried thereby to engage the camera release lever 15 to remove it from the path of the notched cam 16 and thereby release the camera drive mechanism in a well-known manner. When the shaft 61 is rotated to actuate the camera release 15, it rotates the arm 60 to rotate the bell crank arm 58 against the tension of the spring 63 and thereby move the member 52 vertically upward as above described. The upward movement of member 52 carries with it the leg 49 and permits the spring 47 to rotate the diaphragm adjusting lever 24 in a counterclockwise direction until stopped by the stop member 45 coming into engagement with the pointer 30 which has been entrapped by the member 33 in the following manner. The member 52 is provided with an outwardly projecting cam 65 which, upon upward movement of the member 52, engages with an arm of the entrapping member 33 to rotate it against the bias of the spring 42 to entrap the pointer 30 as above described.

In the event insufficient light is available for making a proper exposure, the pointer 30 will be deflected a correspondingly small amount and in order to prevent actuation of the camera under such conditions, an interfering member 66 is pivoted on the bolt 25 and interclutched with the diaphragm adjusting lever 24 by means of a spring 67 which biases the member 66 against a bent-over ear portion 68 of the lever 24. The free end of the member 66 extends into the path of a hook member 69 formed in the member 52 so that the member 52 cannot be moved vertically upward until the lever 24 is rotated sufficiently to move the member 66 out of the path of the hook member 69.

By means of this arrangement the camera can not be operated to make an exposure when the maximum diaphragm opening, such as F.1.9, is insufficient to transmit enough light to make a proper exposure. However, should the operator desire to risk an under exposure in an effort to record a picture of a non-recurring nature, I have provided a rod 70 provided with a head 71 extending outside of the camera casing which may be pressed to release the hook member 69 by pushing the member 66 out of the path of the hook and against the biasing force of the spring 67.

The apparatus as shown in Figs. 1 and 4 does not include the light-sensitive cell and the meter element for actuating the pointer 30. However, it is believed to be obvious in view of the exploded view shown in Fig. 5 that the meter and the cell may be compactly arranged immediately in front of the pointer 30 and its entrapping mechanism.

In Fig. 7, I have shown a modified arrangement of my invention as applied to a motion picture camera in which the light-sensitive cell 26 is positioned above the camera objective and the meter and pointer entrapping mechanism are positioned below the objective. This arrangement permits a very novel arrangement whereby an additional pointer 72 may be mounted on the meter shaft 31 to cooperate with a suitable scale 73. The scale 73 is positioned behind a transparent opening in the front of the camera so that the reading as indicated by the pointer 72 may be easily ascertained. This arrangement provides, in effect, a built-in photometer and is very useful under many conditions where it is desirable to have a light reading for doing special work.

As shown on an enlarged scale in Fig. 5, the comb teeth 34 and the pointer entrapping member 33 are provided with rounded ends so that the pointer 30 will easily slip between the teeth 34 when the entrapping member 33 is moved into entrapping position.

The functional relation between the various parts of the mechanism which has been described above will become evident from the following description of the operation of a camera provided with the diaphragm adjusting arrangement of my invention. With the camera pointed towards a scene to be photographed, the light reflected by the scene will fall upon the light-sensitive cell 26 and cause the pointer 30 to be deflected to a position corresponding to the intensity of such reflected light. The response of the cell 26 is quite rapid and will ordinarily perform its function during the interval the operator is framing the scene through the view finder.

With the scene properly framed, the operator rotates the main operating lever 62 through its range of movement to actuate the camera to make a series of exposures. Assuming that the pointer 30 has been deflected far enough to permit the diaphragm adjusting lever 24 to remove the member 66 out of the path of the hook 69, initial movement of the lever 62 will impart an upward movement to the member 52 which will be followed by rotation of the arm 24, since the spring 47 causes the pin 50 to follow the upward movement of the leg 49 depending from the member 52. This rotation of lever 24 carries with it the member 66, leaving the hook 69 unobstructed. Continued upward movement of the member 52 carries with it the projecting cam 65 which rotates the entrapping means 33 forwardly to lock the pointer 30 in its deflected position between the comb teeth 34. The diaphragm adjusting lever continues to rotate until the stop stud 45 is stopped by the pointer 30 at which time the diaphragm will be adjusted to an opening corresponding to the deflection of the pointer 30 and therefore in accordance with the intensity of the light reflected from the scene to be photographed.

The further movement of the main operating lever 63 does not affect the diaphragm opening, but does cause the arm 64 to engage the camera release lever 15 to disengage the notched cam 16 and thereby release the camera drive to make a series of exposures until the main operating lever 62 is returned to its original position, at which time the camera release lever 15 stops the camera drive and the pointer 30 is freed from the teeth 34 so that the apparatus is in condition to again adjust the diaphragm opening when another series of exposures is to be made.

It is evident from the drawings that the diaphragm control mechanism of my invention does not detract from the portability of a camera, and in fact adds but very little to the size and weight of the camera. While my invention is not confined to any specific structure or arrangement of parts, I prefer an arrangement similar to the one illustrated because of its compactness and suitability for utilizing a somewhat delicate meter pointer as a mechanical obstacle for determining the extent to which the diaphragm may be adjusted.

My invention has been specifically illustrated and described as applied to a motion picture camera. Since it is primarily an arrangement for regulating the intensity of light transmitted to a light-sensitive film, my invention is equally applicable to other photographic apparatus where it is desired to regulate the intensity of a beam of light in a similar way.

While I have shown and described the diaphragm as being substantially rectangular in shape, it will be understood that any suitable diaphragm construction having a movable element for governing the transmission of light therethrough may be employed. It might be well to point out that a diaphragm such as herein described gives very satisfactory results and is especially useful in taking pictures upon lenticular film because it permits regulating the diaphragm without recourse to the use of so-called "alligator jaws" or other cumbersome arrangement.

I have chosen the particular embodiment described above as illustrative of my invention and it will be apparent that various other modifications may be made without departing from the spirit and scope of my invention, which modifications I intend to cover by the appended claims.

What I claim as my invention and desire to be secured by Letters Patent of the United States is:

1. A camera having a lens, a diaphragm and shutter mechanism for controlling the exposure of a sensitive film to light transmitted by the lens and diaphragm, means to set the diaphragm automatically to various sized apertures according to the light coming from the subject to be photographed, said diaphragm setting means comprising a light sensitive cell for receiving reflected light from the subject, a meter element for deflecting a pointer element in accordance with activation of said cell, means for entrapping and holding the pointer in its deflected position, resilient means for biasing the diaphragm to one extreme setting, means for adjusting the diaphragm towards another extreme setting, and means movable with said adjusting means for engaging the entrapped pointer to limit the adjustment of the diaphragm.

2. In a motion picture camera, a lens, a gate for supporting a sensitive film in position to be exposed to light transmitted by the lens, means for regulating the intensity of the light transmitted to the gate, a light sensitive cell adapted to be activated in accordance with the intensity of the light falling on the lens, a displaceable member, means controlled by said cell for displacing said member, means movable into a position for holding said member in its displaced position, means for adjusting said light regulating means to a position determined by the position of the displaceable member, shutter means for exposing the sensitive film to light passed by said regulating means and means for actuating in sequence said holding means, said adjusting means and said shutter means.

3. In a photographic camera having an adjustable diaphragm, a mechanism for controlling the setting to which the diaphragm may be adjusted in accordance with existing light conditions comprising a light-sensitive cell responsive to existing light conditions, a pointer, means controlled by said cell for deflecting the pointer in accordance with the response of said cell; movable means for adjusting the diaphragm, a member carried by the movable means adapted to move against said pointer and thereby limit the extent to which said movable means may be moved, means for holding the pointer in its deflected position, manually actuated means for sequentially operating said pointer holding means and said diaphragm adjusting means, and means movable with said movable means for adjusting the diaphragm for preventing the operation of said manually actuated means when the deflection of said pointer is less than a predetermined amount.

4. A camera for making a photographic record of a scene including a diaphragm and means for actuating the camera, a member movable to release said actuating means, a light sensitive cell adapted to be activated by light reflected by the scene, means for adjusting the diaphragm, means for limiting the adjustment of the diaphragm in accordance with the response of the cell, and means operatively connected to the cell for preventing movement of said release member when the response of said cell is less than a predetermined value.

5. Mechanism for controlling the adjustment of a diaphragm comprising a light-sensitive cell adapted to be activated by light incident thereon, a rotatable meter element actuated by the response of the light-sensitive cell, a pointer carried by said meter element, means for entrapping the pointer to hold it stationary, operating means for moving said entrapping means into engagement with the pointer, means connected to said operating means for adjusting the diaphragm and means movable with said adjusting means adapted to engage said pointer to limit the adjustment of said diaphragm, whereby the diaphragm is adjusted in accordance with the response of said cell.

6. A photographic camera including an operating lever for bringing about the exposure of a sensitized element and an adjustable diaphragm for varying the degree of such exposure, mechanism for controlling the adjustment of the diaphragm in accordance with the illumination to which said element is to be exposed comprising a meter pointer, a light sensitive cell for controlling the deflection of said pointer in accordance with such illumination, means for entrapping said pointer in its deflected position, means for adjusting the diaphragm, means movable with said adjusting means and adapted to engage said pointer for limiting in one direction the adjustment of the diaphragm, and motion transmitting means connected to the operating lever for operating in sequence said pointer entrapping means and said diaphragm adjusting means.

7. A camera for making a photographic record of a scene including a diaphragm and means for actuating the camera, means for adjusting the diaphragm, a light sensitive cell adapted to be activated by light reflected by the scene, means for limiting the adjustment of the diaphragm in accordance with the response of the cell, means connected to said adjusting means for preventing operation of the camera actuating means when the response of the cell is less than a predetermined value, and manually operable means for rendering ineffective said operation preventing means.

JOSEPH MIHALYI.